United States Patent
Florimond

(10) Patent No.: US 10,592,876 B2
(45) Date of Patent: Mar. 17, 2020

(54) ONLINE TRANSACTIONAL SYSTEM FOR PROCESSING ALTERNATIVE METHODS OF ELECTRONIC PAYMENT

(71) Applicant: Amadeus S.A.S., Biot (FR)

(72) Inventor: Cédric Florimond, Vallauris (FR)

(73) Assignee: AMADEUS S.A.S., Biot (FR)

( * ) Notice: Subject to any disclaimer, the term of this patent is extended or adjusted under 35 U.S.C. 154(b) by 750 days.

(21) Appl. No.: 15/093,425

(22) Filed: Apr. 7, 2016

(65) Prior Publication Data
US 2017/0293902 A1    Oct. 12, 2017

(51) Int. Cl.
| G06Q 40/00 | (2012.01) |
| G06Q 20/10 | (2012.01) |
| G06Q 10/02 | (2012.01) |
| G06Q 20/40 | (2012.01) |
| G06Q 50/14 | (2012.01) |

(52) U.S. Cl.
CPC .......... G06Q 20/102 (2013.01); G06Q 10/02 (2013.01); G06Q 20/409 (2013.01); G06Q 50/14 (2013.01)

(58) Field of Classification Search
CPC .................................................... G06Q 20/367
USPC ............................................................. 705/38
See application file for complete search history.

(56) References Cited

U.S. PATENT DOCUMENTS

| 2013/0246199 | A1* | 9/2013 | Carlson ................. G06Q 20/20 705/16 |
| 2014/0067675 | A1 | 3/2014 | Leyva et al. |
| 2015/0134540 | A1 | 5/2015 | Law et al. |
| 2015/0178708 | A1 | 6/2015 | Reutov |

OTHER PUBLICATIONS

JoAnn DeLuna; "Payment Firms Turn Page on Tame 2013"; BusinessTravelNews.com; May 26, (Year: 2014).*
European Patent Office, Official Action issued in European Application No. 17 000 473.3 dated Jun. 11, 2018.
European Patent Office, Official Action issued in Application No. 17 000 473.3 dated Feb. 8, 2019.

* cited by examiner

Primary Examiner — Edward Chang
(74) Attorney, Agent, or Firm — Thompson Hine LLP

(57) ABSTRACT

Online transactional processing systems, methods, and computer program products for processing an alternative method of electronic payment (AMOP) in online transactions. A mass storage memory device hosts a database that stores data for transforming one or more virtual payment forms into data that relates to one or more AMOP's. Each of the one or more virtual payment forms stored in the database is compatible with a legacy system of a merchant. In response to receiving, in relation to an online transaction with the merchant, data that relates to an AMOP, the data that relates to the AMOP is transformed to create a virtual payment form that is compatible with the legacy system of the merchant. The virtual payment form is then transmitted to the legacy system of the merchant for processing, and data for transforming the virtual payment form into data relating to the AMOP is stored in the database.

20 Claims, 4 Drawing Sheets

ONLINE TRANSACTIONAL SYSTEM FOR PROCESSING ALTERNATIVE METHODS OF ELECTRONIC PAYMENT

TECHNICAL FIELD

The present invention relates to online transactional processing systems and, more particularly, to systems, methods, and computer program products for processing alternative methods of electronic payment in online transactions.

BACKGROUND

The typical online transaction involves communications between several independently operated actors. For example, when a consumer initiates an online transaction with a merchant for a good or service, the consumer usually provides credit card information to the merchant. Thereafter, the merchant processes the credit card information and communicates it to the merchant's acquiring bank. The acquiring bank then contacts the issuing bank for the consumer's credit card, and requests appropriate payment from the consumer's account. After payment is received from the issuing bank, the acquiring bank provides the payment to the merchant in exchange for the good or service.

Because credit cards have historically been the primary form of payment in online transactions, the actors involved in such transactions, including merchants, have typically designed their infrastructures around the credit card format. As a result, the systems implemented by these actors to process online transactions have been routinely designed so as to understand and process credit cards as the principal form of payment, and very few if any other forms of payment. The landscape for online transactions is changing, however, as many payment providers are now offering alternative methods of electronic payment (AMOP's), which give consumers additional options for completing purchases.

Accordingly, a need exists for improved online transactional systems, methods, and computer program products for enabling legacy systems to process AMOP's.

SUMMARY

In one embodiment, an online transactional system for processing an AMOP includes a mass storage memory device that hosts a database. The database is configured to store data for transforming one or more virtual payment forms into data relating to one or more AMOP's. Each of the one or more virtual payment forms is compatible with a legacy system of a merchant. The online transactional system also includes one or more processors and a memory coupled to the one or more processors. The memory stores instructions that upon execution by the one or more processors cause the online transactional system to, in response to receiving, in relation to an online transaction with the merchant, data that relates to an AMOP, transform the data that relates to the AMOP to create a virtual payment form that is compatible with the legacy system of the merchant. The instructions upon execution further cause the online transactional system to transmit the virtual payment form to the legacy system of the merchant for processing, and, after the virtual payment form is created, store data for transforming the virtual payment form into data relating to the AMOP in the database.

In another embodiment, a method for processing an AMOP in an online transactional processing system includes receiving, in relation to an online transaction with a merchant, data that relates to the AMOP, and in response to receiving the data that relates to the AMOP, transforming the data that relates to the AMOP to create a virtual payment form that is compatible with a legacy system of the merchant. The method further includes transmitting the virtual payment form to the legacy system of the merchant for processing, and after the virtual payment form is created, storing data for transforming the virtual payment form into data that relates to the AMOP in a database hosted on a mass storage memory device.

In a further embodiment, a computer program product includes a non-transitory computer readable medium and instructions stored on the non-transitory computer readable medium. Upon execution by one or more processors of an online transactional processing system, the instructions cause the online transactional processing system to, in response to receiving, in relation to an online transaction with a merchant, data that relates to an AMOP, transform the data that relates to the AMOP to create a virtual payment form that is compatible with a legacy system of the merchant. The instructions upon execution further cause the online transactional processing system to transmit the virtual payment form to the legacy system of the merchant for processing, and after the virtual payment form is created, to store data for transforming the virtual payment form into data that relates to the AMOP in a database hosted on a mass storage memory device.

BRIEF DESCRIPTION OF THE DRAWINGS

Embodiments of the present invention will be understood and appreciated more fully from the following detailed description taken in conjunction with the drawings.

DETAILED DESCRIPTION

One or more of the embodiments described herein are directed to online transactional processing systems that enable a merchant's legacy systems to process AMOP's in a secure manner, and without the merchant having to spend considerable time and resources updating its legacy systems for compatibility with each accepted AMOP. In this way, the embodiments described herein may improve the functioning of the merchant's legacy systems by improving their capabilities without increasing the drain on the legacy systems' resources (e.g., memory, processors).

In particular, when a customer initiates an online transaction with a merchant and elects to use an AMOP as payment, AMOP-related data for the online transaction may be generated and transmitted to the merchant's legacy systems for processing. The elected AMOP, or more particularly the AMOP-related data, however, may not be compatible with the merchant's legacy systems. In other words, the merchant's legacy systems, which may have been designed to only understand and process traditional payment forms (e.g., credit cards), may not understand or be able to process the AMOP-related data for the online transaction. Consequently, if the merchant's legacy systems were to receive the AMOP-related data, a processing error would occur.

Hence, prior to the merchant's legacy systems receiving payment information for the online transaction, a system may intercept and transform the AMOP-related data to create a virtual payment form that is compatible with the merchant's legacy systems. In this way, the virtual payment form, which the merchant's legacy systems are able to understand, may be transmitted to and processed by the merchant's legacy systems without error. As a result, the functionality of the merchant's legacy systems is improved by enabling them to process the elected AMOP via the virtual payment form, and do so in a manner that does not significantly affect the drain of the legacy system's resources, as the transformation may occur outside of and prior to the legacy systems receiving the virtual payment form.

Moreover, data may be stored in a database for verifying and/or transforming a virtual payment form into AMOP-related data, which may be the same or different from the AMOP-related data initially generated for the online transaction. In this way, when a merchant attempts to collect payment against the virtual payment form for the online transaction, the virtual payment form may first be transformed to AMOP-related data based on the stored data, and thereafter transmitted to an appropriate acquirer, such as a bank, for payment collection. These and other features are described in more detail below.

Figure 1:
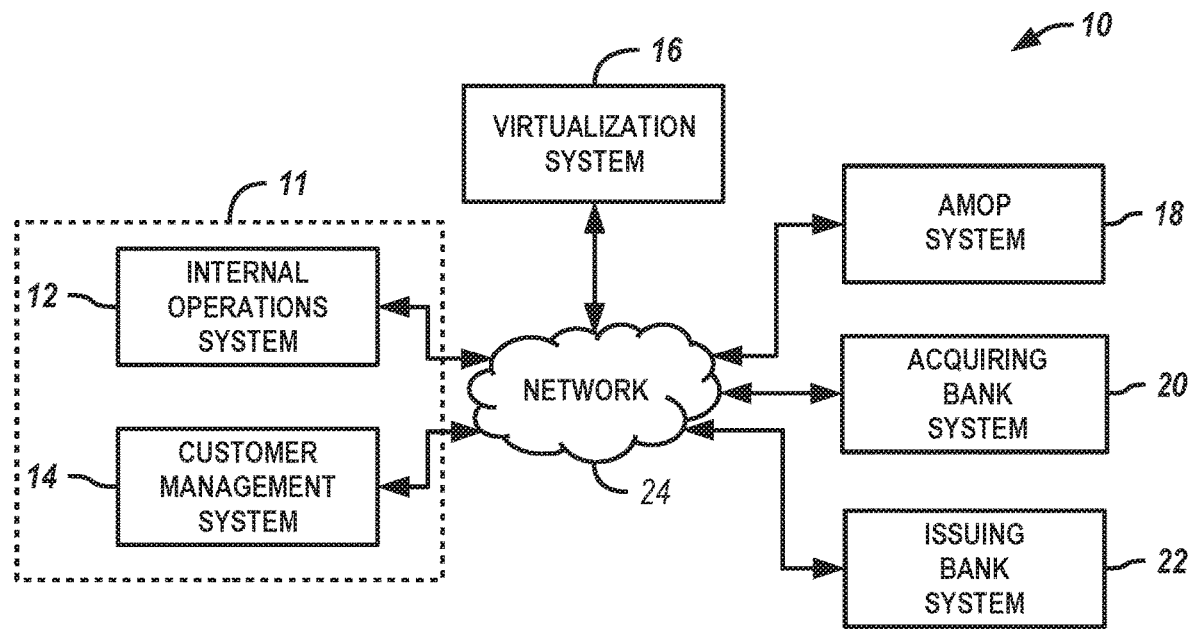
FIG. 1 is a schematic view of an exemplary operating environment that includes a plurality of computer systems that may be involved in an online transaction.

FIG. 1 provides an exemplary operating environment 10 that may include one or more merchant legacy systems 11, a virtualization system 16, an AMOP system 18, an acquiring bank system 20, and/or an issuing bank system 22. Each of these systems may communicate with one another through a network 24, which may include the Internet. In addition, any two or more of these systems may be integrated with one another in a single system.

The merchant legacy systems 11 may include any system of a merchant, such as an airline or travel agent, that is configured to facilitate the business operations of the merchant. In one embodiment, the merchant legacy systems 11 may include an internal operations system 12 and/or a customer management system 14. The internal operations system 12 may be provided by the merchant itself, and may be configured to perform one or more of the merchant's back-office operations. For example, the internal operations system 12 may be configured to perform functions such as internal record keeping, accounting, billing, etc. Moreover, the internal operations system 12 may be configured to commence payment-related operations with the AMOP system 18 and/or the acquiring bank system 20, such as captures, refunds, settlements, and/or reconciliations.

The customer management system 14, which may be separately provided by a third party and/or integrated with the internal operations system 12, may be configured to provide functions that enable customers to interact with and purchase goods or services from the merchant, as well as provide functions for managing the provision of purchased goods or services to the customer. In one example, the customer management system 14 may include a front end system, such as a user interface in which customers may initiate online transactions, or an application programming interface for interaction with other systems in the operating environment 10. Moreover, the customer management system 14 may include a reservation system that stores one or more reservation or purchase records. For example, if the merchant is an airline, hotel, car rental agency, etc., then the reservation system of the customer management system 14 may generate and store passenger name records (PNR's) for each reservation or purchase made with the merchant. Each PNR may include information relating to the reservation or purchase (such as a travel itinerary for one or more airline passengers), fares or fees used to price the reservation or purchase, and a Form of Payment (FOP) element that indicates the specific form of payment, such as credit card information, that was used to make the reservation or purchase. The customer management system 14 may further include a ticketing system for issuing electronic tickets, and an inventory system for tracking available inventory of the merchant (e.g., seats remaining on each flight segment on a given date). In the specific case of an airline merchant, the customer management system 14 may additionally include a departure control system (DCS) that manages the airline's airport operations on the day of travel (e.g., checking in passengers and printing boarding passes).

The AMOP system 18 may be configured provide customers the ability to utilize AMOP's in online transactions. In general, AMOP's enable customers to circumvent or supplement traditional forms of payment (e.g., credit cards) in online transactions with alternatives such as award points, bitcoins, PAYPAL, APPLE PAY, etc. Customers may desire to use AMOP's for various reasons, such as personal preference, loyalty, better benefits, and/or increased online security. In general, the AMOP system 18 may be implemented by a particular AMOP provider, such as PAYPAL, VISA, MASTERCARD, etc. Alternatively, the AMOP system 18 may belong to a third-party that is involved in the selling of goods or services of one or more merchants and that has incorporated the use of AMOP's into its system, such as a Global Distribution System (GDS), a Billing and Settlement Plan, and/or some other gateway site that enables the searching for and purchasing of goods or services.

The merchant legacy systems 11 may have been specifically designed so as to be capable of understanding and processing traditional forms of payment only. Consequently, if the legacy systems 11 were to receive AMOP-related data, such as from the AMOP system 18, as payment for an online transaction, the legacy systems 11 may be unable to process the AMOP-related data and complete the transaction. Specifically, none of the legacy systems 11 may be capable of understanding how to collect and/or account for payments based on the AMOP-related data.

In order to give the legacy systems 11 additional functionality for processing AMOP's, one solution might be to completely overhaul each legacy system 11 so as to understand certain AMOP's. This solution, however, would be very complex and entail considerable time spent by specialists reprogramming each of the legacy systems 11. Specifically, reprogramming a legacy system 11 to handle a new AMOP may impact each the legacy system's 11 functions, such as revenue accounting, billing, record keeping, reservations, inventory management, etc. Moreover, such complex system overhauls would need to be performed for every additional AMOP desired to be added to the legacy systems 11, which would ultimately increase the drain on the legacy systems' physical resources (e.g., each new AMOP may require additional memory and/or processing bandwidth).

The virtualization system 16 of operating environment 10 avoids these problems. More particularly, the virtualization system 16 may be configured as a gateway or fire-wall between the AMOP system 18 and the legacy systems 11, and may be configured to transform AMOP-related data for an online transaction into a virtualized form of payment, such as a virtual credit card, that is compatible with the legacy systems 11. Once generated, the virtualized (and compatible) payment form may be transmitted to the legacy systems 11, which are now able to understand and process the payment provided for the online transaction. Because each of the legacy systems 11 is configured to process the virtualized payment form, further virtualization or conversion of the virtualized payment form may not be necessary when it is communicated between the legacy systems 11. In other words, the same messages that have been communicated between the legacy systems 11 and that have been built around traditional forms of payment may continue to be used. For example, legacy systems 11 in the travel industry may continue to communicate via traditional HOT files (sales reports sent to an airline's revenue accounting systems), RET files (sales reports sent to a travel agencies' back office systems), PNR Publisher files (images of a PNR published to third parties, such as airlines, accounting systems, and customs), and AIR files (notifications of ticket issuances sent to an airline's back office).

The virtualization system 16 may also be configured to transform the virtualized payment form back into AMOP-related data for the purpose of payment-related operations requested by the legacy systems 11, such as captures, refunds, settlements, etc. In particular, after the legacy systems 11 have received and/or processed the virtualized payment form, the legacy systems 11 may attempt a payment-related operation, such as payment collection, by sending a capture file that includes the virtualized payment form to the AMOP system 18 or the acquiring bank system 20. Prior to the data being received at the AMOP system 18 or the acquiring bank system 20, however, the data may be received at the virtualization system 16, which may then transform the virtual payment form back into the AMOP data format. Thereafter, the virtualization system 16 may transmit the AMOP-related data to the AMOP system 18 or the acquiring bank system 20, which, unlike the legacy systems 11, may be capable of understanding and processing the AMOP-related data. In this way, the virtualization system 16 enables the logic of AMOP processing to be concentrated with the AMOP system 18, the acquiring bank system 20, and/or the issuing bank system 22, and not with the legacy systems 11, which thereby reduces the drain on the legacy systems' 11 physical resources.

In some embodiments, the virtualization system 16 may be configured to administer some or all of the above-described payment-related operations without having to transform the virtual payment form back to the AMOP data format. More particularly, the more the virtualization system 16 is configured to be in charge of such payment-related operations, the less transforming that may be necessary. For example, if the virtualization system 16 is configured to initiate a payment-related operation based on received AMOP-related data, then the virtualization system 16 may not need to transform a virtual payment form back to the AMOP-related data in order to facilitate the payment-related operation. In other words, the virtualization system 16 may be configured to transform the AMOP-related data received from the AMOP system 18 to a virtual payment form for use by the legacy systems 11, and also may be configured to initiate one or more of the above payment-related operations based on the received AMOP-related data.

In any event, after the AMOP-related data is received at the AMOP system 18 or the acquiring bank system 20, the receiving system may communicate, possibility via one or more additional systems, with the issuing bank system 22 of the customer and request payment from the customer's account (e.g., the acquiring bank system 20 may request payment via the AMOP system 18). Alternatively, the AMOP system 18 or the acquiring bank system 20 may already have available funds pre-paid by the customer. In any case, once payment for the online transaction is located at the AMOP system 18 or the acquiring bank system 20, the payment may be provided to the merchant.

Figure 2:
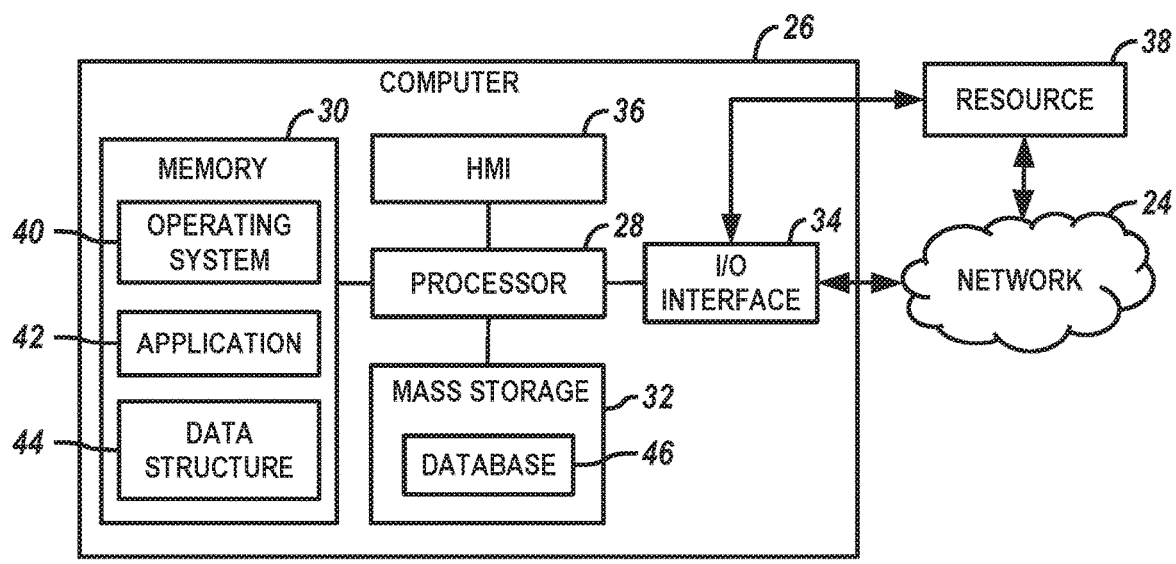
FIG. 2 is a schematic view of an exemplary computer system of FIG. 1.

Referring now to FIG. 2, the legacy systems 11, the virtualization system 16, the AMOP system 18, the acquiring bank system 20, and/or the issuing bank system 22 of operating environment 10 may be implemented on one or more computer devices or systems, such as exemplary computer system 26. The computer system 26 may include a processor 28, a memory 30, a mass storage memory device 32, an input/output (I/O) interface 34, and a Human Machine Interface (HMI) 36. The computer system 26 may also be operatively coupled to one or more external resources 38 via the network 24 or I/O interface 34. External resources may include, but are not limited to, servers, databases, mass storage devices, peripheral devices, cloud-based network services, or any other suitable computer resource that may be used by the computer system 26.

The processor 28 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 30. The memory 30 may include a single memory device or a plurality of memory devices including, but not limited, to read-only memory (ROM), random access memory (RAM), volatile memory, non-volatile memory, static random access memory (SRAM), dynamic random access memory (DRAM), flash memory, cache memory, or any other device capable of storing information. The mass storage memory device 32 may include data storage devices such as a hard drive, optical drive, tape drive, non-volatile solid state device, or any other device capable of storing information.

The processor 28 may operate under the control of an operating system 40 that resides in the memory 30. The operating system 40 may manage computer resources so that computer program code embodied as one or more computer software applications, such as an application 42 residing in the memory 30, may have instructions executed by the processor 28. In an alternative embodiment, the processor 28 may execute the application 42 directly, in which case the operating system 40 may be omitted. One or more data structures 44 may also reside in memory 30, and may be used by the processor 28, operating system 40, or application 42 to store or manipulate data.

The I/O interface 34 may provide a machine interface that operatively couples the processor 28 to other devices and systems, such as the network 24 or the one or more external resources 38. The application 42 may thereby work cooperatively with the network 24 or the external resources 38 by communicating via the I/O interface 34 to provide the various features, functions, applications, processes, or modules comprising embodiments of the invention. The application 42 may also have program code that is executed by the one or more external resources 38, or otherwise rely on functions or signals provided by other system or network components external to the computer system 26. Indeed, given the nearly endless hardware and software configurations possible, persons having ordinary skill in the art will understand that embodiments of the invention may include applications that are located externally to the computer system 26, distributed among multiple computers or other external resources 38, or provided by computing resources (hardware and software) that are provided as a service over the network 24, such as a cloud computing service.

The HMI 36 may be operatively coupled to the processor 28 of computer system 26 in a known manner to allow a user to interact directly with the computer system 26. The HMI 36 may include video or alphanumeric displays, a touch screen, a speaker, and any other suitable audio and visual indicators capable of providing data to the user. The HMI 36 may also include input devices and controls such as an alphanumeric keyboard, a pointing device, keypads, push-buttons, control knobs, microphones, etc., capable of accepting commands or input from the user and transmitting the entered input to the processor 28.

A database 46 may reside on the mass storage memory device 32, and may be used to collect and organize data used by the various systems and modules described herein. The database 46 may include data and supporting data structures that store and organize the data. In particular, the database 46 may be arranged with any database organization or structure including, but not limited to, a relational database, a hierarchical database, a network database, or combinations thereof. A database management system in the form of a computer software application executing as instructions on the processor 28 may be used to access the information or data stored in records of the database 46 in response to a query, where a query may be dynamically determined and executed by the operating system 40, other applications 42, or one or more modules. In an embodiment of the invention, the database 46 may comprise a conversion database 56 and/or a used payment database 58 (FIG. 3), which are each discussed in further detail below.

Figure 3:
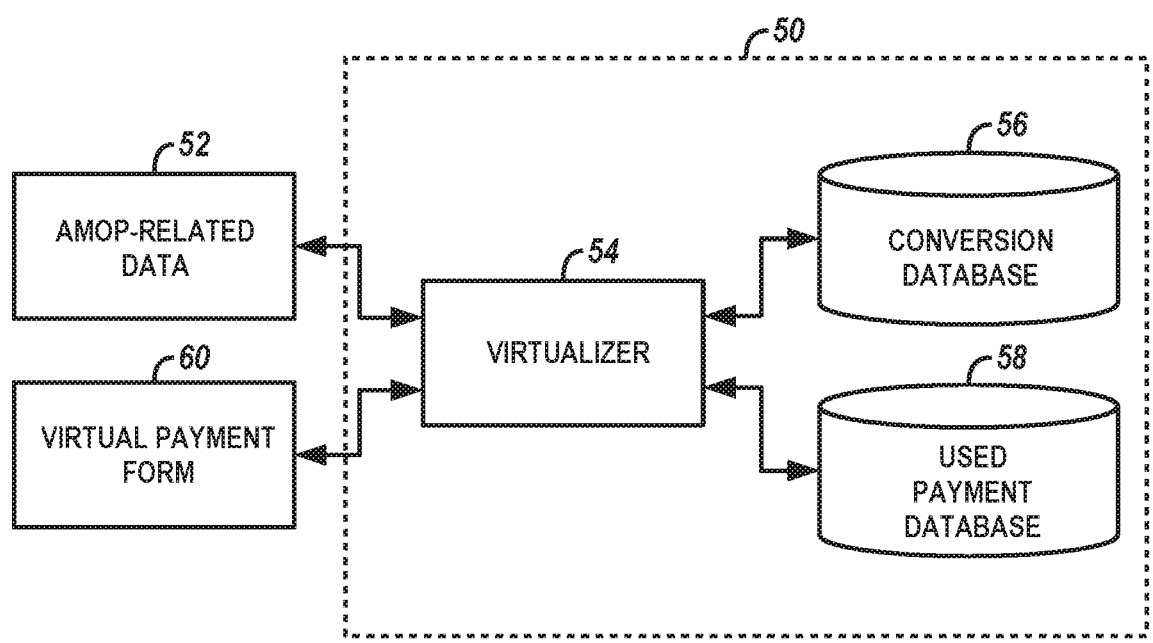
FIG. 3 is a schematic view of an exemplary processing architecture that may be implemented by one or more of the computer systems in FIG. 1.

FIG. 3 provides an exemplary processing architecture 50 that may be provided by one or more of the systems of the operating environment 10 or any other suitable computer system. The processing architecture 50 may include a virtualizer 54, a conversion database 56, and/or a used payment database 58. In operation, the processing architecture 50, and more particularly the virtualizer 54, may receive AMOP-related data 52, such as from the AMOP system 18 of operating environment 10, and transform the AMOP-related data 52 into a virtual payment form 60 that is compatible with the legacy systems 11 of operating environment 10. The processing architecture 50 may also perform this virtualization process in reverse (i.e., transform the virtual payment form 60 to the AMOP-related data 52). The conversion database 56 may be configured to store data for verifying and/or transforming the virtual payment form 60 into the AMOP-related data 52, and the used payment database 58 may be configured to indicate those virtual payment forms 60 that have been used and should no longer be processed or honored by the virtualizer 54. The processing architecture 50 may further be configured to operate in both an online mode (e.g., with an active Internet connection) and an offline mode (e.g., without an active Internet connection).

Figure 4:
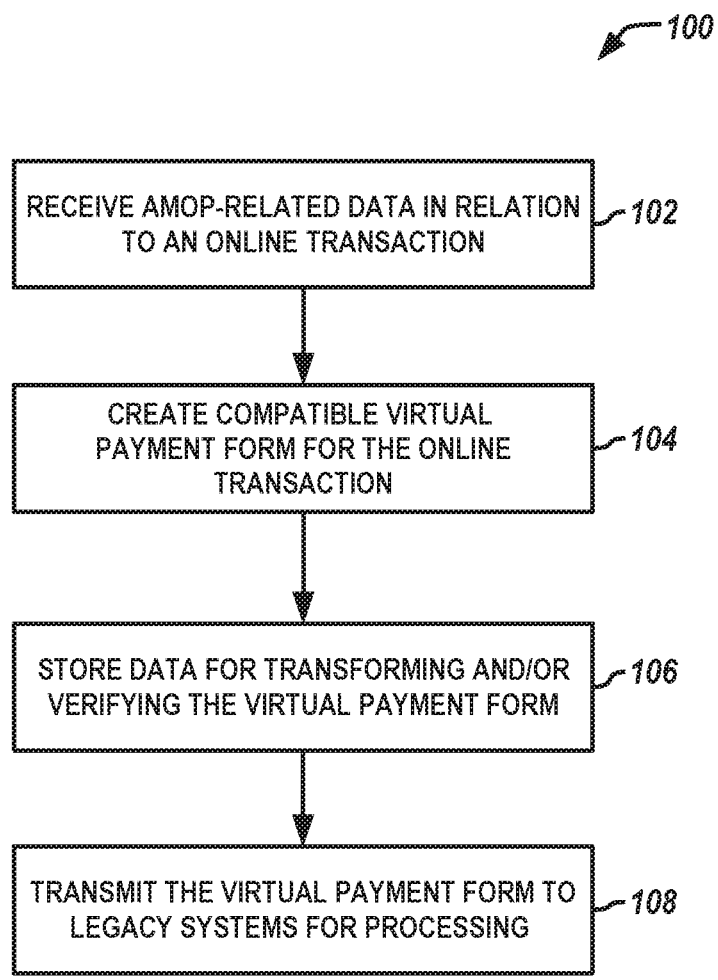
FIG. 4 is a flowchart of an exemplary process for creating a virtual payment form that may be performed by the processing architecture of FIG. 3.

FIG. 4 provides an exemplary process 100 that may be performed by the processing architecture 50. In block 102, AMOP-related data 52 may be received, such as at the virtualizer 54, in relation to an online transaction with a merchant. In particular, the AMOP-related data 52 may be received from the AMOP system 18 after a customer initiates an online transaction with the merchant for a good or service and elects to use an AMOP associated with the AMOP system 18 as payment. The AMOP-related data 52 may include an AMOP token that is generated by the AMOP system 18 and is intended to be used by a merchant and/or acquiring bank system 20 to request payment for an online transaction, an identifier or code specific to the elected AMOP or the AMOP system 18, and a payment record ID (PRI) generated by the AMOP system 18 for the online transaction. The AMOP-related data 52, or more particularly the AMOP token, may also include a user ID and/or account number for the initiating customer relative to the elected AMOP, a password for the initiating customer relative to the elected AMOP, and/or a payment amount, which may be a monetary value or may be a value in units specific to the elected AMOP (e.g., points), approved to be claimed against AMOP token. The AMOP-related data 52, or more particularly the AMOP token, may also include an expiration date in which the AMOP token will no longer be useable or honored by the AMOP system 18.

In block 104, a virtual payment form 60 that is compatible with the legacy systems 11 of the merchant may be created for the online transaction, such as by the virtualizer 54 and/or based on the AMOP-related data 52. In particular, the virtualizer 54 may be configured to transform or change the AMOP-related data 52 to create the virtual payment form 60, such as by adding new numbers or characters to one or more items included in the AMOP-related data 52, and thereby fundamentally altering the items in the AMOP-related data 52 into a different form of payment that is compatible with the legacy systems 11. In one embodiment, the virtual payment form 60 may be a virtual credit card, which may be one of the few forms of payment that the legacy systems 11 are able to recognize as valid and process. In this case, the legacy systems 11 may process the virtual credit card as if it were a real credit card issued by a bank to the customer.

Credit cards typically include features that enable identification of the issuing bank for the credit card, that enable identification of a customer's account with the issuing bank, and/or that help promote security. In one example, a credit card may include a credit card number that comprises a bank identification number (BIN), which may identify the issuing bank of the credit card, a primary account number (PAN), which may identify the customer's account with the issuing bank, and a check digit, which may be used to verify the accuracy of the credit card number using a verification algorithm, such as the Luhn algorithm. In particular, the Luhn algorithm, which is also known as the "modulus ten" algorithm, is a simple checksum formula that may be used to validate the rest of the credit card number against the check digit.

Credit cards may also include an expiration date after which the issuing bank will no longer honor or accept the credit card for an online transaction, and a Card Verification Value (CVV), which may be computed based on the credit card number and a non-public algorithm and/or non-public data. The CVV may serve as an additional security measure for the credit card, such as in online transactions where the credit card is not physically present. Because the legacy systems 11 may have been specifically configured so as to only recognize and process credit cards having a proper credit card number, an expiration date, and a CVV, the virtual credit card may need to be generated so as to include each of these features as well.

In some embodiments, the virtualizer 54 may transform the AMOP-related data 52 to create a credit card number for a virtual credit card by combining and/or adding numbers or characters to items in the AMOP-related data 52. More particularly, the virtual credit card number may include a portion that comprises a sequence of digits specific to the elected AMOP, and a portion that comprises a sequence of digits specific to the to the online transaction and/or the virtual payment form 60. Hence, to form the virtual credit card number, the virtualizer 54 may be configured to determine the sequence of digits specific to the AMOP based on the identifier or code that is included the AMOP-related data 52, determine the sequence of digits specific to the online transaction and/or virtual payment form 60, and append the sequence of digits specific to the elected AMOP to the sequence of digits specific to online transaction and/or virtual payment form 60. In other words, the sequence of digits specific to the elected AMOP may be used for the BIN portion of the virtual credit card number, and the sequence of digits specific to the online transaction and/or virtual payment form 60 may be used for the PAN portion of the virtual credit card number.

In one example, the sequence of digits specific to the elected AMOP may include the identifier or code specific to the elected AMOP in the AMOP-related data 52. The sequence of digits specific to the online transaction and/or virtual payment form 60 may be a unique number generated by the virtualizer 54, such as sequentially or via a computer-implemented random number generator, which may be a true random number generator or pseudorandom number generator, for the purpose of the virtualization process. Alternatively, the sequence of digits specific to the online transaction and/or virtual payment form 60 may be a transaction ID associated with the online transaction, which may already be a unique sequence of digits. The transaction ID may be the PRI included in the AMOP-related data 52, or may be generated by the virtualizer 54 for each online transaction in which the virtualizer 54 is involved.

In some embodiments, the above-described sequences of digits may form only a portion of the virtual credit card number. To compute the remaining portion of the virtual credit card number, the virtualizer 54 may be configured to calculate a check bit that satisfies a verification algorithm, such as the Luhn algorithm, relative to the portion of the virtual credit card number determined above (i.e., the appended sequences of digits). The virtualizer 54 may further be configured to thereafter append the determined check bit to the portion of the virtual credit card number determined above, or more particularly, to the end of the determined PAN portion that is opposite the determined BIN portion, to form the complete virtual credit card number.

In another embodiment, the virtualizer 54 may transform the AMOP-related data 52 into a virtual credit card number using non-public data and a non-public preprogrammed algorithm. For example, the virtualizer 54 may generate, using the non-public preprogrammed algorithm, the virtual credit card number based on the user ID and/or account number contained in AMOP token of the AMOP-related data 52, an Md5-like hash value of the password contained in the AMOP token of the AMOP-related data 52, a secret key, a random value based on a timestamp till millisecond, and/or a private number sequence.

In yet another embodiment, the virtualizer 54 may transform the AMOP-related data 52 into a virtual credit card number by virtue of basing the virtual credit card number on data that is not included in the AMOP-related data 52, and thereafter associating the AMOP-related data 52 with the virtual credit card number in the conversion database 56. In this way, security of the processing architecture 50 may be improved, as it will not be possible to derive the AMOP-related data 52 from the virtual credit card number alone. For example, the virtualizer 54 may be configured to generate a sequence of digits to be used as the BIN portion of the virtual credit card number. The sequence of digits may be specific to the elected AMOP identified in the AMOP-related data 52, and may be generated sequentially or using a computer-implemented random number generator, which may be a true random or pseudorandom number generator, for each accepted AMOP. Thereafter, the virtualizer 54 may be configured generate a remaining portion of the virtual credit card number (e.g., the PAN portion and the check bit) so that a verification algorithm, such as the Luhn algorithm, is satisfied. The sequence of digits generated for the PAN portion and check bit may be unique relative to other virtual credit card numbers including the same BIN portion so as to distinguish each customer or online transaction that utilizes a same AMOP. Similar to the BIN portion, the PAN portion may be generated sequentially or using a computer-implemented random number generator.

A CVV and an expiration date may also be generated or associated with the virtual credit card generated for the online transaction. More particularly, the virtualizer 54 may be configured to associate an expiration date with the virtual credit card that is equivalent to the expiration date included in the AMOP token. If no expiration date is included in the AMOP token, then a default expiration date that is long enough to enable the virtual credit to be used for one transaction (e.g., an hour) may be inferred. To generate the CVV for the virtual credit card, the virtualizer 54 may be configured to generate a short sequence of digits, such as a 3-digit or a 4-digit number, for this purpose. In particular, the virtualizer 54 may include and/or be configured to generate, prior to receiving the AMOP-related data 52, a non-public sequence of random digits, which may be generated using a computer-implemented random number generator, which may be a true random or pseudorandom number generator. For each new virtual credit card, the virtualizer 54 may be configured to sequentially extract, as the CVV for the virtual credit card, three or more currently unused digits (i.e., those digits not used with a currently active virtual credit card) from the pre-generated sequence. For example, if the currently unused digits of the pre-generated sequence are "345386" in sequence, then the virtualizer 54 may first extract "345" as a CVV for a next new virtual credit card, and thereafter extract "386" as a CVV for a following new virtual credit card. To ensure that the pre-generated sequence does not run out of currently unused digits for subsequent virtual credit cards, the sequence of digits may be of a length such that one or more virtual credit cards will expire before the sequence of digits is ever exhausted. In other words, the pre-generated sequence may be long enough such that to go through it entirely would take longer than the expiration date generated and associated with one or more of the virtual credit cards. In this way, currently unused digits may always be available to generate a CVV. The appropriate length for the pre-generated sequence may be determined based on empirical data.

In block 106, data for transforming and/or verifying the virtual payment form 60 may be stored, such as by the virtualizer 54, in the conversion database 56. More particularly, the conversion database 56 may be configured to store data for verifying and transforming each of one or more virtual payment forms 60 into AMOP-related data, which may be the same as or different from the AMOP-related data 52 that was initially received and prompted creation of the virtual payment form 60. Each of the one or more virtual payment forms 60 may be compatible with the legacy systems 11. In other words, once a virtual payment form 60 has been generated, data for transforming it back into AMOP-related data may be stored in the conversion database 56.

In one embodiment, for each virtual payment form 60 created by the virtualizer 54, data may be stored in the conversion database 56 that defines the virtual payment form 60 and links it to all or part of the AMOP-related data 52 from or for which the virtual payment form 60 is created. More particularly, each virtual payment form 60 may be linked to the AMOP token included in the AMOP-related data 52, a transaction ID associated with virtual payment form 60, such as the PRI included in the AMOP token or a unique sequence of digits generated by the virtualizer 54, and/or the type of AMOP associated with the AMOP token, such as the code specific to the elected AMOP included in the AMOP-related data 52 or generated by the virtualizer 54. If the virtual payment form 60 is a virtual credit card in which the virtual credit card number itself includes a code specific to the elected AMOP, then linking the type of AMOP may occur by virtue of storing data defining the virtual payment form 60 in the conversion database 56. If not, then the code specific to the elected AMOP may be separately stored and linked to the virtual payment form 60 within the conversion database 56.

In another embodiment, the data stored in the conversion database 56 may only link each virtual payment form 60 with non-personal variable data that is necessary to decode the virtual payment form 60 back into AMOP-related data. For example, when the virtual payment form 60 is generated based on non-public data elements and a non-public preprogrammed algorithm as described above, the virtual payment form 60 may be linked within the conversion database 56 to the non-personal variable data that is unique to the generation of the virtual payment form 60, such as the random value generated based on the timestamp. Other non-personal data, such as the secret key and the private number sequence, may be compiled as part of the algorithm itself, and personal data, such as the user ID, account number, and/or the password of the AMOP-related data 52, may not need to be persistently stored. In this way, should the conversion database 56 ever become compromised, any data extracted from the conversion database 56 would be useless for determining the user ID, account number, and/or password of the AMOP-related data 52 without knowledge of the non-public preprogrammed algorithm and the other non-public data elements. Consequently, the overall security of the system may be improved.

In block 108, after the virtual payment form 60 has been generated, it may be transmitted to the merchant legacy systems 11 for processing. For example, the legacy systems 11 may validate the virtual payment form 60, such as by checking that all necessary information of the virtual payment form 60 is present. In the case of a virtual credit card, the legacy systems 11 may also confirm that the check bit of the virtual credit card number satisfies a verification algorithm, such as the Luhn algorithm, and/or that the provided CVV is valid for the virtual credit card number. Additionally or alternatively, the legacy systems 11 may perform record keeping functions, billing functions, and/or any other appropriate functions based on the virtual payment form 60. For example, in the case of an online transaction that involves an airline merchant, the customer management system 14 may receive the virtual payment form 60 from the virtualizer 54, store the virtual payment form 60 in the FOP element of a PNR relating to the booking created in the online transaction, and thereafter forward the PNR to the internal operations system 12 for use in additional processes. The legacy systems 11 may also initiate a payment-related operation with the AMOP system 18 and/or the acquiring bank system 20 of operating environment 10 based on the virtual payment form 60, such as a capture operation, a refund operation, a settlement operation, or a reconciliation operation.

Figure 5:
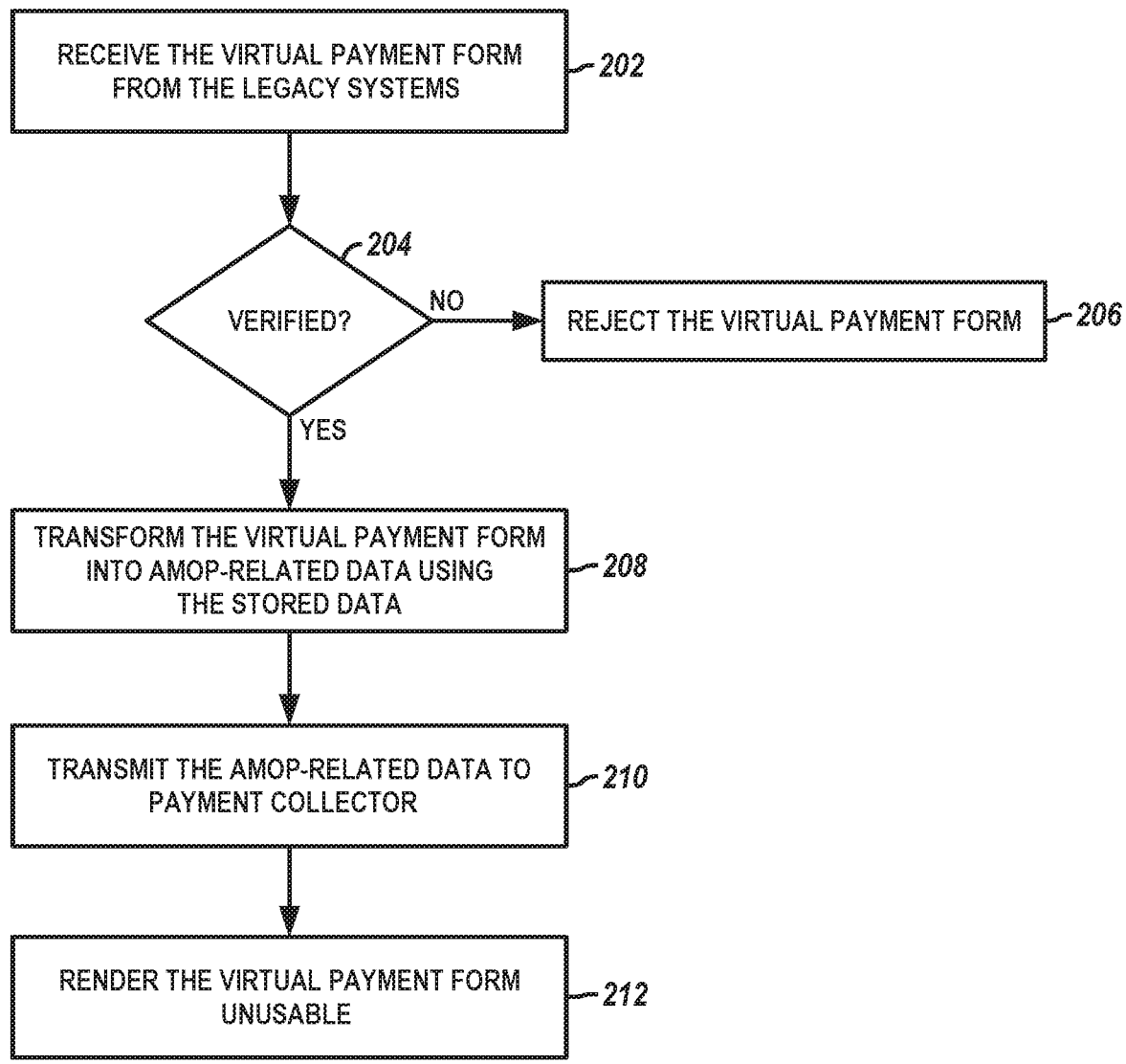
FIG. 5 is a flowchart of an exemplary process for transforming a virtual payment form into AMOP-related data that may be performed by the processing architecture of FIG. 3.

FIG. 5 illustrates a process 200 that may be performed by the processing architecture 50. In block 202, the virtual payment form 60 may be received, such as at the virtualizer 54, from the legacy systems 11. For example, the legacy systems 11 may attempt to transmit the virtual payment form 60 to the AMOP system 18 or the acquiring bank system 20 for the purpose of a payment-related operation. Upon the legacy systems 11 transmitting the virtual payment form 60 to the AMOP system 18 or the acquiring bank system 20, the virtualizer 54 may intercept the communication and determine whether it includes a virtual payment form 60. If so, then in block 204, the virtualizer 54 may determine whether the virtual payment form 60 may be verified based on the data stored in block 106 of the process 100.

For example, verification of a virtual payment form 60 may include checking or verifying that the virtual payment form 60 is stored in the conversion database 56, is not expired, and not indicated as used, such as by virtue of being stored in the used payment database 58. In the case of a virtual payment form 60 that includes a virtual credit card number, a VCC, and/or an expiration date, for example, the virtualizer 54 may be configured to check or verify that the virtual credit card number of the virtual payment form 60 is associated with the VCC and/or the expiration date of the virtual payment form 60 within the conversion database 56.

If the provided virtual payment form 60 cannot be verified ("NO" branch of block 204), then in block 206, the request for the payment-related operation may be rejected, and the virtualizer 54 may be configured to transmit a message to the legacy systems 11 informing of the rejected request. Alternatively, if the virtual payment form 60 is verified ("YES" branch of block 204), then in block 208, the virtual payment form 60 may be transformed into AMOP-related data based on the data stored in block 106 of the process 100. More particularly, the virtualizer 54 may transform the virtual payment form 60 back into the AMOP-related data 52 that prompted the creation of the virtual payment form 60 based on the data stored in the conversion database 56 for the virtual payment form 60.

Alternatively, when transforming the virtual payment form 60 to AMOP-related data, the virtualizer 54 may be configured to add additional information to the resulting AMOP-related data, which may function to lower interchange rates, shift liability, etc. For example, some AMOP systems 18 and acquiring bank systems 20 may require that data detailing a purchase or reservation (e.g., flight details) or data indicating that the payer was authenticated be included in AMOP-related data transmitted thereto in order to accept liability for and/or process a payment-related operation.

In some embodiments, certain processing methods may be implemented in the processing architecture 50, and more particularly the virtualizer 54, to speed up the virtualization process in both directions, which consequently may enable faster processing for online transactions. The particular processing method used may depend on the format of the message carrying the AMOP-related data 52 and/or the virtual payment form 60. For example, the processing architecture 50 may be configured to utilize regular expression for processing binary or simple message formats. In addition or alternatively, the processing architecture 50 may be configured to utilize Extensible Stylesheet Language Transformations (XSLT) from an XML Schema Definition (XSD) for structured messages, such as those in the Extensible Markup Language (XML) format or the Electronic Data Interchange for Administration, Commerce and Transport (EDIFACT) format. In addition or alternatively, the processing architecture 50 may be configured to support JavaScript Objection Notation (JSON), and if no standard exists for a JSON structure, then a Management Data Warehouse (MDW) may be implemented that is capable of being used with an XSD to define and validate a JSON message.

In block 210, after the virtual payment form 60 has been transformed into AMOP-related data, the AMOP-related data may be transmitted, such as by the virtualizer 54, to the appropriate entity for performing the payment-related operation requested by the legacy systems 11. For example, once the virtual payment form 60 has been transformed, the resulting AMOP-related data may be transmitted to an acquirer, such as the AMOP system 18 or the acquiring bank system 20, for the purposes of collecting payment based on the AMOP-related data.

As previously discussed, in some embodiments, the virtualizer 54 itself may be configured to administer some or all of the payment-related operations. In this case, rather than waiting to receive a request for a payment-related operation that includes the virtual payment form 60 from the legacy systems 11 and thereafter transforming the virtual payment form 60 into AMOP-related data, the virtualizer 54 may be configured to send a payment-related request itself based on the originally received AMOP-related data 52. In other words, the virtualizer 54 may be configured to transform the received AMOP-related data 52 to a virtual payment form 60 for use by the legacy systems 11, and also may be configured to initiate one or more of the above-described payment-related operations without having to transform the virtual payment form 60 back to the AMOP data format.

In block 212, as an additional security measure, once an online transaction involving a virtual payment form 60 has been completed and/or payment has been received by the merchant, or the expiration date associated with the virtual payment form 60 has passed, the virtual payment form 60 may be rendered unusable for future transactions, either within a given period or indefinitely. More particularly, the virtual payment form 60 may be stored in the used payment database 58, or alternatively may be marked as used within the conversion database 56. In this way, if another request for a payment-related operation that includes the virtual payment form 60 is either fraudulently or accidently received at the virtualizer 54, the virtualizer 54 may be configured to query one of the databases to determine whether the virtual payment form 60 has already been used in another transaction or is expired. If so, then the virtualizer 54 may decline to transform the virtual payment form 60 into AMOP-related data, and may transmit a corresponding message to the requesting party.

Moreover, because the processing architecture 50 may be configured such that any given virtual payment form 60 may only be used for one transaction, either within a given period or indefinitely, the virtual payment forms 60 generated by the virtualizer 54 may be outside the scope of certain data security standards. For example, the PCI Security Standards Council has assembled Data Security Standards (DSS) that include several procedures for merchants to follow when processing credit cards, such as multi-use physical credit cards, which many states have adopted or used in creating their own laws. Implementation of these procedures may result in additional costs to the merchant and additional processing time by the processing architecture 50 and the legacy systems 11. Single use virtual credit cards, however, fall outside the scope of the DSS. Hence, the use of one-time virtual payment forms 60, such as a virtual credit card, in the processing architecture 50 and merchant legacy systems 11 may reduce costs to the merchant, and reduce overall complexity and processing time, as the virtual payment form 60 may be transmitted to and processed by the legacy systems 11 without implementing additional procedures or processes involving the virtual payment form 60 for the purpose of complying with such data security standards.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. An online transactional system for processing an alternative method of electronic payment (AMOP), the online transactional system comprising:

a mass storage memory device that hosts a database;
one or more processors; and
a memory coupled to the one or more processors, wherein the memory stores instructions that upon execution by the one or more processors cause the online transactional system to:
intercept payment information transmitted by a client system to a legacy system of a merchant in relation to an online transaction, the payment information comprising AMOP-related data that includes an AMOP token; and
in response to intercepting the payment information:
transform the AMOP-related data to create a virtual payment form that is compatible with the legacy system using the AMOP token and non-public data external to the AMOP-related data,
transmit the virtual payment form to the legacy system for processing, and
after the virtual payment form is created, store transformation data for transforming the virtual payment form into the AMOP-related data in the database.

2. The online transactional system of claim 1, wherein the virtual payment form comprises a virtual credit card that includes a credit card number, a first portion of the credit card number comprises a first sequence of digits specific to the AMOP, and a second portion of the credit card number comprises a second sequence of digits specific to the online transaction.

3. The online transactional system of claim 2, wherein the AMOP-related data includes an identifier specific to the AMOP, and wherein to transform the AMOP-related data, the instructions upon execution by the one or more processors, further cause the system to:
determine the first sequence of digits based on the identifier specific to the AMOP included in the AMOP-related data;
determine the second sequence of digits specific to the online transaction;
append the second sequence of digits to the first sequence of digits to form a portion of the credit card number;
calculate a check digit that satisfies a verification algorithm relative to the portion of the credit card number; and
append the check digit to the portion of the credit card number to form the credit card number.

4. The online transactional system of claim 3, wherein the first sequence of digits comprises the identifier specific to the AMOP included in the AMOP-related data, and the instructions cause the online transactional system to determine the second sequence of digits specific to the online transaction using a random number generator.

5. The online transactional system of claim 2, wherein the virtual credit card comprises a card verification value, and wherein to transform the AMOP-related data, the instructions upon execution by the one or more processors, further cause the system to:
generate a third sequence of digits using a random number generator prior to intercepting the payment information; and
extract, as the card verification value, three or more currently unused digits from the third sequence of digits in sequence.

6. The online transactional system of claim 1, wherein the instructions upon execution further cause the online transactional system to:
receive, from the legacy system, the virtual payment form;

verify the virtual payment form based on the transformation data stored in the database;
in response to the virtual payment form being verified, transform the virtual payment form into the AMOP-related data based on the transformation data; and
transmit the AMOP-related data to an acquirer for payment collection.

7. The online transactional system of claim 6, wherein the virtual payment form includes a virtual credit card that includes a credit card number and a card verification value, and wherein to verify the virtual payment, the instructions upon execution by the one or more processors, further cause the system to:
verify that the credit card number is associated with the card verification value within the transformation data.

8. The online transactional system of claim 1, wherein the instructions upon execution further cause the online transactional system to:
render the virtual payment form unusable for another online transaction.

9. The online transactional system of claim 1, wherein the merchant is an airline, the online transaction comprises a travel booking, and the transmission of the virtual payment form to the legacy system enables the legacy system to generate a passenger name record for the travel booking that includes a payment element indicating the virtual payment form.

10. The online transactional system of claim 1, wherein the virtual payment form comprises a virtual credit card, and the instructions upon execution cause the online transactional system to transmit the virtual payment form to the legacy system without the virtual payment form being further processed to comply with a data security standard that relates to multi-use physical credit cards.

11. A method for processing an alternative method of electronic payment (AMOP) in an online transactional processing system, the method comprising:
intercepting payment information transmitted by a client system to a legacy system of a merchant in relation to an online transaction, the payment information comprising AMOP-related data including an AMOP token; and
in response to intercepting the payment information:
transforming, by the one or more processors, the AMOP-related data to create a virtual payment form that is compatible with a legacy system of the merchant using the AMOP token and non-public data external to the AMOP-related data,
transmitting, by the one or more processors, the virtual payment form to the legacy system for processing, and
after the virtual payment form is created, storing, by the one or more processors, transformation data for transforming the virtual payment form into the AMOP-related data in a database hosted on a mass storage memory device.

12. The method of claim 11, wherein the virtual payment form comprises a virtual credit card that includes a credit card number, a first portion of the credit card number comprises a first sequence of digits specific to the AMOP, and a second portion of the credit card number comprises a second sequence of digits specific to the online transaction.

13. The method of claim 12, wherein the AMOP-related data includes an identifier specific to the AMOP, and wherein transforming the AMOP-related data comprises:
determining the first sequence of digits based on the identifier specific to the AMOP included in the AMOP-related data;
determining the second sequence of digits specific to the online transaction;
appending the second sequence of digits to the first sequence of digits to form a portion of the credit card number;
calculating a check digit that satisfies a verification algorithm relative to the portion of the credit card number; and
appending the check digit to the portion of the credit card number to form the credit card number.

14. The method of claim 13, wherein the first sequence of digits comprises the identifier specific to the AMOP included in the AMOP-related data, and wherein the second sequence of digits specific to the online transaction is determined using a random number generator.

15. The method of claim 12, wherein the virtual credit card comprises a card verification value, and wherein transforming the AMOP-related data comprises:
generating a third sequence of digits using a random number generator prior to intercepting the payment information; and
extracting, as the card verification value, three or more currently unused digits from the third sequence of digits in sequence.

16. The method of claim 11, further comprising:
receiving, from the legacy system, the virtual payment form;
verifying the virtual payment form based on the transformation data stored in the database;
in response to the virtual payment form being verified, transforming the virtual payment form into the AMOP-related data based on the transformation data; and
transmit the AMOP-related data to an acquirer for payment collection.

17. The method claim 16, wherein the virtual payment form includes a virtual credit card that includes a credit card number and a card verification value, and wherein verifying the virtual payment form comprises:
verifying that the credit card number is associated with the card verification value within the transformation data.

18. The method of claim 11, further comprising:
rendering the virtual payment form unusable for another online transaction.

19. The method claim 11, wherein the merchant is an airline, the online transaction comprises a travel booking, and the transmission of the virtual payment form to the legacy system enables the legacy system to generate a passenger name record for the travel booking that includes a payment element indicating the virtual payment form.

20. A computer program product comprising:
a non-transitory computer readable medium; and
instructions stored on the non-transitory computer readable medium that upon execution by one or more processors of an online transactional processing system cause the online transactional processing system to:
intercept payment information transmitted by a client system to a legacy system of a merchant in relation to an online transaction, the payment information comprising alternative method of electronic payment related data (AMOP-related data) that includes an alternative method of electronic payment (AMOP) token; and in response to intercepting the payment information:
- transform the AMOP-related data to create a virtual payment form that is compatible with the legacy system of the merchant using the AMOP token and non-public data external to the AMOP-related data,
- transmit the virtual payment form to the legacy system for processing, and
- after the virtual payment form is created, store transformation data for transforming the virtual payment form into the AMOP-related data in a database hosted on a mass storage memory device.

\* \* \* \* \*